(12) United States Patent
Schwarz et al.

(10) Patent No.: US 11,593,417 B2
(45) Date of Patent: Feb. 28, 2023

(54) ASSIGNING DOCUMENTS TO ENTITIES OF A DATABASE

(71) Applicant: International Business Machines Corporation, Armonk, NY (US)

(72) Inventors: Thomas Schwarz, Stuttgart (DE); Albert Maier, Tuebingen (DE); Michael Baessler, Bempflingen (DE); Oliver Suhre, Stuttgart (DE); Peter Gerstl, Holzgerlingen (DE); Werner Schuetz, Nufringen (DE); Jonathan Roesner, Leimersheim (DE); Mariya Chkalova, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 17/153,953

(22) Filed: Jan. 21, 2021

(65) Prior Publication Data

US 2022/0229863 A1    Jul. 21, 2022

(51) Int. Cl.
| | |
|---|---|
| *G06F 16/00* | (2019.01) |
| *G06F 16/35* | (2019.01) |
| *G06F 16/33* | (2019.01) |
| *G06F 16/93* | (2019.01) |

(52) U.S. Cl.
CPC .......... *G06F 16/353* (2019.01); *G06F 16/334* (2019.01); *G06F 16/93* (2019.01)

(58) Field of Classification Search
None
See application file for complete search history.

(56) References Cited

U.S. PATENT DOCUMENTS

| | | | |
|---|---|---|---|
| 8,131,087 B2 * | 3/2012 | Takebe | G06V 30/262 |
| | | | 382/229 |
| 10,140,511 B2 * | 11/2018 | Macciola | G06V 30/412 |
| 10,318,593 B2 * | 6/2019 | Ghatage | H04N 1/2166 |
| 10,380,147 B1 * | 8/2019 | Omland | G06F 16/30 |
| 2012/0072464 A1 | 3/2012 | Cohen | |
| 2013/0325882 A1 | 12/2013 | Deshpande | |
| 2015/0039611 A1 | 2/2015 | Deshpande | |

OTHER PUBLICATIONS

"Document Classification & Routing", ScanStore, Printed Jul. 7, 2020, 3 pages, <https://www.scanstore.com/>.

(Continued)

*Primary Examiner* — Debbie M Le
(74) *Attorney, Agent, or Firm* — Edward J. Wixted, III (57) ABSTRACT

In an approach, a processor groups documents into a plurality of groups based on similarity, where: documents of each group have a same document structure; and the document structure is defined by coordinates of text blocks. A processor, for each group of the plurality of groups and for each document of the respective group: retrieves a value of each text block of the respective document in accordance with a document structure of the group; and assigns to each text block of the respective document an attribute that represents the retrieved value of the text block. A processor assigns a first document of the documents to an entity of a database that matches the first document based on the group of text block values and the assigned attributes of the document.

20 Claims, 7 Drawing Sheets

(56) References Cited

OTHER PUBLICATIONS

"Forms processing", Wikipedia, page was last edited on Dec. 19, 2019, Printed Jul. 7, 2020, 3 pages, <https://en.wikipedia.org/wiki/Forms_processing#Automated_forms_pr>.

Diem, Markus, "Text Classification and Layout Analysis for Document Reassembling", Computer Vision Lab Institute of Computer Aided Automation, Vienna University of Technology, Mar. 9, 2014, 160 pages, <https://cvl.tuwien.ac.at/wp-content/uploads/2014/12/tr-13.pdf>.

Murthy et al., "Content-Aware Master Data Management", Proceedings of the International Conference on Management of Data (COMAD 2010), Dec. 8-10, 2010, Nagpur, India, 5 pages, <https://www.academia.edu/2694802/Content-Aware_Master_Data_Management>.

Murthy et al., "Exploiting Evidence from Unstructured Data to Enhance Master Data Management", Proceedings of the VLDB Endowment, vol. 5 No. 12, Aug. 2012, Istanbul, Turkey, 13 pages, <https://dl.acm.org/doi/10.14778/2367502.2367524>.

\* cited by examiner

Fig. 1A

TOM GREEN HANDYMAN —130.1
5 Any Street, Any City, That Area Code —130.2
Telephone: 0800 XXX XXX —130.3

Date: 6/5/2016 —130.4

Invoice No: 0003521 —130.9
Tax Registered No 123456 —130.10

Mr and Mrs Fielding —130.5
This Address —130.6
This City —130.7
This Area Code —130.8

TAX INVOICE —130.11

| Quantity | Description | Unit Price | Cost |
|---|---|---|---|
| | Upgrade to Bathroom | | |
| 23.75 | Labour | 40.00 | 950.00 |
| 50 | Nails and screws | 0.80 | 40.00 |
| 1 | Paint and Plywood | 1000.00 | 1000.00 |
| 40 | Imported wall tiles | 14.00 | 560.00 |
| 1 | Freight | 150.00 | 150.00 |
| 1 | Sub-contractor : Tile-It | | 228.00 |
| | | Subtotal | 2928.00 |
| | | Tax | 439.20 |
| | | Total Due | $3,367.20 |

Payment due by the 10th of the month following the date of invoice.
Please make payment into Bank Account No. 12 3456 789112 012

Interest of 10% per year will be charged on late payments.

Cut here

Remittance

Mr and Mrs Fielding

TOM GREEN HANDYMAN
5 Any Street                                      Amount Due  $3,367.20
Any City
That Area Code                                    Amount Paid ________

ASSIGNING DOCUMENTS TO ENTITIES OF A DATABASE

BACKGROUND

The present invention relates generally to the field of digital computer systems, and more particularly to assigning documents to entities of a database.

Scanning a paper document may provide an image version of the document and further processing may be required to perform text extraction. For the text extraction, an Optical Character Recognition ("OCR") process may be performed on the scanned document and the recognized textual content may be stored. However, with the tremendous increase of used paper documents, the processing of such documents may need to be improved.

Cohen (US 2012/0072464 A1) (hereinafter Cohen) describes that "a plurality of input records may be received from a plurality of sources, and each input record may include a plurality of fields. It may then be detected that a set of input records from different sources are related to each other (e.g., are duplicates). One of the set of input records may be automatically selected as a master record in accordance with a record level rule. At least one field in the master record may, according to some embodiments, be automatically modified based on a corresponding field in another input record in accordance with a field level rule. The modified master record could then be stored for subsequent use by other applications." (Cohen, Abstract).

A disadvantage of current processes is that such processes do not include an automated approach to attach documents to a data management system.

SUMMARY

Various embodiments provide a method for assigning documents to entities of a database, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer-implemented method for assigning documents to entities of a database. The method comprises: grouping the documents based on their similarity, wherein documents of each group have a same document structure, wherein the document structure is defined by at least coordinates of text blocks; for each group of the groups: for each document of the group: retrieving a value of each text block of the document in accordance with the document structure of the group, resulting in each document having a group of text block values; assigning to each text block of the text blocks of the document structure of the group of documents an attribute that represents the retrieved values of said text block; assigning a document of the documents to an entity of the database that matches the document using the group of text block values and the assigned attributes of the document.

In another aspect, the invention relates to a computer program product comprising a computer-readable storage medium having computer-readable program code embodied therewith, the computer-readable program code configured to implement all of the steps of the method according to preceding embodiments.

In another aspect, the invention relates to a computer system being configured for: grouping documents based on their similarity, wherein documents of each group have a same document structure, wherein the document structure is defined by at least coordinates of text blocks; for each group of the groups: for each document of the group: retrieving a value of each text block of the document in accordance with the document structure of the group, resulting in each document having a group of text block values; assigning to each text block of the text blocks of the document structure of the group of documents an attribute that represents the retrieved values of said text block; assigning a document of the documents to an entity of a database that matches the document using the group of text block values and the assigned attributes of the document.

Computer systems of service providers usually include storages for storing information related to customers and services. Some of the information may be provided when the customers fill in registration forms, service request forms or other forms such as contract documents, bank transactions, certificates, etc. However, as a high number of forms may be stored in image format (e.g., scanned forms), the extraction of information of the forms may be a challenging technical task. In addition, such computer systems may store data of the customers and services in a structured format such as databases. This may result in a same entity such as a person being associated with information in different formats in the systems. This may provide another challenge for mapping or associating information of different types. For example, a person may need a report on all his/her personal information stored on the system(s) regardless of how they are stored. This may, for example, enable the person to decide to delete some or all private data, e.g., on request right to get forgotten, that means deletion of all the data about a person on request. However, looking at a single scanned document the pieces of the information may be hard to identify by a machine in an automated manner. As such, it may be very likely to miss documents that should be connected to the person. The present subject matter may solve this issue by enabling an automatic document assignment to entities of the database using a grouping technique. The documents may, for example, be attached to the golden record of the person in a database such as master data management (MDM) database in order to satisfy the above request. The present subject matter may assign documents to individual persons (or entities in the database) in order to comply with regulatory requirements such as reporting to a person all information that is stored on that person.

BRIEF DESCRIPTION OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Documents may be stored in image format, e.g., scanned forms or other formats that enable the extraction of values or contents of text blocks in the document. Text blocks may comprise one more finite sequences of characters, wherein a character may be a number, a letter, or a special character. An entity has a distinct and separate existence. An entity has certain attributes or features, which may be assigned values. For example, a student is an entity. The attributes for a student's entity may be a roll number, name, date of birth and class. The entity may be represented with a respective record of a database.

Embodiments of the present invention may enable the sorting of documents into groups by their visible structure (e.g., form, layout). For example, rental contracts may have the same visible structure, insurance contracts may have the same visible structure, report cards may have the same visible structure, etc. Each group may contain only documents of the same visible structure. In each visible structure, input fields are searched for and a table is created. Each input field is assigned a column in the table. The rows are filled by filling the cell in each column with the content of the corresponding field in the corresponding document. A data classification algorithm can very effectively be applied to each column in order to find the label for each column. Based on the labels, the documents can be assigned to the MDM entities (e.g. persons). The step of assigning, to each text block of the text blocks of the document structure of the group of documents, an attribute may or may not use the attributes of the database. In one example, attributes of the database may be assigned to the text blocks by determining which text block corresponds to which attribute of the database. In another example, the attribute may be assigned independently of the database, e.g., using a data mining approach.

According to one embodiment, assigning the document to the entity comprises: identifying attributes of the database that correspond to at least part of the assigned attributes of the document, comparing the text block values of said at least part of the assigned attributes with corresponding attribute values of the identified attributes of each entity of the database, wherein the comparisons result in matching scores, comparing the highest matching score with a threshold, wherein the entity assigned to the document is associated with the highest matching score that is higher than the threshold. This may be advantageous as it may help to increase the effectiveness of the present method, since it may allow to compensate for imprecisions which may be introduced in previous steps. Imprecisions may be due to scanning (e.g., OCR) errors caused by a bad scanning quality, or data getting assigned into the wrong attributes. Data may get assigned to a wrong attribute because, for example, some extra line somewhere on the form may cause the text block recognition to put values into the wrong attribute, and even allow the entity of the database itself to have issues.

For example, assume that the group of text block values of the document comprises m values $BV_1, BV_2 \ldots BV_m$ of corresponding assigned attributes $ATT_1, ATT_2 \ldots ATT_m$ and the database comprise N entities, wherein each entity has values of k attributes $at_1, at_2 \ldots at_k$, wherein k may be the same or different from m. This embodiment may identify attributes of the k attributes of the database that match or correspond to the attributes $ATT_1, ATT_2 \ldots ATT_m$. This identification may result in, for example, all m attributes having corresponding attributes in the k attributes of the database or may result in only a subset of the m attributes having corresponding attributes in the k attributes of the database. Assuming, for example, r attributes $ATT_1, ATT_2 \ldots ATT_r$ of the m attributes $ATT_1, ATT_2 \ldots ATT_m$ have been identified as having corresponding attributes in the database, wherein r≤m. The text block values of the r attributes $ATT_1, ATT_2 \ldots ATT_r$ may be compared with the attribute values the corresponding attributes $at_1, at_2 \ldots at_r$ of each entity of the database. For example, comparisons of the following pairs of attribute values may be performed: $(at_1, ATT_1), (at_2, ATT_2) \ldots (at_r, ATT_r)$. This may result in r comparison results (e.g. r individual matching scores) per entity, wherein the r comparison results may be combined, e.g., summed or averaged to obtain one matching score. The whole comparisons may result in N matching scores associated with the N entities of the database respectively. The highest matching score of the N matching scores may be compared with the threshold. If the highest matching score is smaller than the threshold then the document may not be assigned to any entity of the database. If the highest matching score is higher than or equal to the threshold then the document may be assigned to the entity of the database that is associated with the highest matching score.

The comparisons of the pairs of attribute values $(at_1, ATT_1), (at_e, ATT_2) \ldots (at_r, ATT_r)$ may each be performed using an edit distance and/or a phonetic matching method such as the Soundex algorithm. The comparison methods may, for example, be provided by the MDM entity analytics. For example, an edit distance may be computed between each pair of attribute values $(at_1, ATT_j)$ (j=1, ... r) and an individual matching score may be determined as function of the edit distance. In another example, the phonetic matching method may be applied on each pair of attribute values $(at_j, ATT_j)$ (j=1, ... r) and an individual matching score may be determined as function of the result of the phonetic matching method. In another example, part of the pairs of attribute values may be compared using the edit distance and the remaining part may be compared using the phonetic matching method. In another example, both the phonetic matching method and the edit distance may be applied on each pair of attribute values $(at_j, ATT_j)$ (j=1, ... r) and an individual matching score may be determined as function of the result of the phonetic matching method and the edit distance.

According to one embodiment, the database comprises values of a set of attributes. The approach further comprises: determining for each attribute of the set of attributes an identification logic based on a format and/or content of the attribute value. The identification logic recognizes values of the respective attribute, wherein the assigning of the attribute to the text block comprises running the logics on the retrieved values of the text block. The identification logic may, for example, comprise a regular expression that may be used to detect a certain string as a product identifier. For example, if the values of a text block do not allow to associate them with an attribute, a user may be prompted to provide the attribute or an empty attribute may be associated with the text block. This embodiment may be advantageous because the comparison between the assigned attribute values (which are text block values) may be performed one to one with corresponding attributes in the database. This may provide a reliable comparison result.

According to one embodiment, the database comprises tables and/or columns that correspond to business terms of a business glossary, wherein each term of the business terms is associated with an identification logic based on a format and/or content of the business term, wherein the assigning of the attribute to the text block comprises running the logics on the retrieved values of the text block. The business glossary may comprise a list of business terms with their definitions. The business glossary defines terms across a business domain. For example, the business glossary defines business concepts for an organization or industry. The business glossary may enable sharing internal vocabulary within an organization.

According to one embodiment, determining that the entity matches the document comprises: comparing the group of text block values with attribute values of the entity based on the assigned attributes, wherein the comparison results in a matching probability and determining that the matching probability is higher than a predefined threshold. For example, attributes of the database that correspond to the assigned attributes may be identified. The values of the identified attributes of each entity in the database may be compared with the group of text block values of the document, and the entity that is associated with the highest matching probability that is higher than the predefined threshold is the entity that matches the document.

According to one embodiment, determining that the entity matches the document comprises: prompting a user with the group of text block values and the assigned attributes in order to select the entity that matches the document, and receiving a selection of the entity.

According to one embodiment, the grouping of the documents based on their similarity is performed using a visual clustering approach.

According to one embodiment, the documents are provided with predefined templates respectively, wherein the documents of each group are associated with the same template.

According to one embodiment, the documents are forms, wherein the text blocks of the documents are input fields.

According to one embodiment, the approach further comprises providing, to a person associated with the entity, information indicating that the document is associated with the entity.

According to one embodiment, the approach is automatically performed. For example, the approach may automatically be performed on a periodic basis, wherein in each repetition the approach is executed on currently stored documents on the computer system. In another example, the approach may automatically be performed in response to a change in the documents, e.g., new document(s) are stored.

According to one embodiment, the database is a MDM database.

According to one embodiment, the documents are images, preferably scanned documents.

According to one embodiment, the approach further comprises, for each group of the groups: creating a table having columns associated with the text blocks of the document structure of the group respectively and rows associated with the documents of the group respectively. Assigning the document to the entity of the database comprises assigning a row of the table associated with the document to the entity of the database. This may enable a systematic and efficient processing of the documents as it may scale with increasing number of documents being processed.

According to one embodiment, the method further comprises assigning each document of the documents to the respective entity of the database.

Figure 1A:
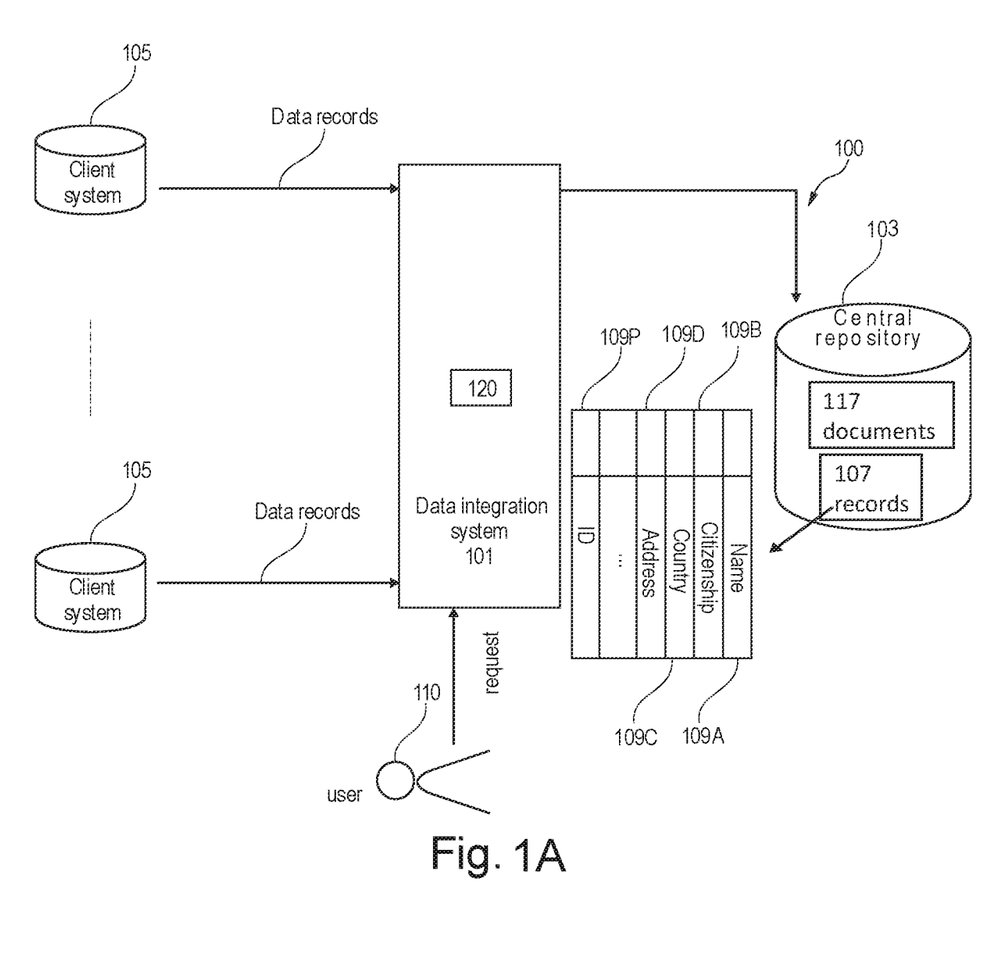
FIG. 1A is a block diagram of a computer system in accordance with an embodiment of the present invention.
Figure 1B:
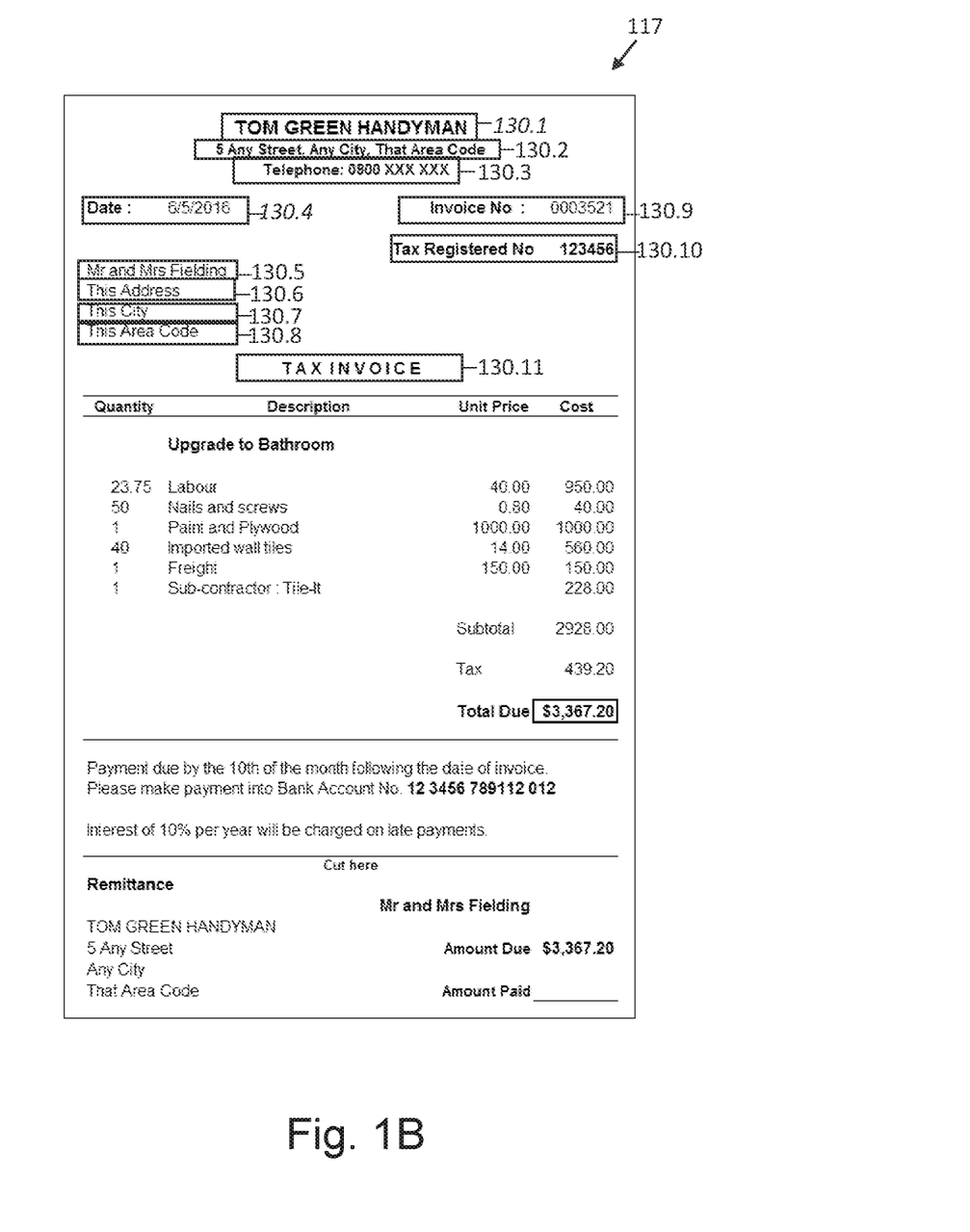
FIG. 1B is a block diagram of a document in accordance with an embodiment of the present invention.

FIG. 1A depicts a computer system 100. The computer system 100 may, for example, be configured to perform master data management and/or data warehousing. The computer system 100 comprises a data integration system 101 and one or more client systems or data sources 105. The client system 105 may comprise a computer system. The client systems 105 may communicate with the data integration system 101 via a network connection which comprises, for example, a wireless local area network (WLAN) connection, WAN (Wide Area Network) connection, LAN (Local Area Network) connection the internet or a combination thereof. The data integration system 101 may control access (read and write accesses, etc.) to a central repository 103. The central repository 103 may comprise a database storing records 107 and documents 117. The documents 117 may, for example, be scanned forms. For example, a company owning the computer system 100 may provide template forms that may be filled by employees or clients of the company. This may result in a large number of paper documents. Those paper documents may be scanned and stored in the repository 103. The documents 117 may further comprise forms that have been electronically filled. FIG. 1B depicts an example document 117. The document 117 comprises text blocks 130.1 through 130.11 which are surrounded by respective boxes in FIG. 1B. Each of the text blocks 130.1 through 130.11 may have coordinates indicating the position and the area of the text block. Each of the text blocks 130.1 through 130.11 may have content or value. For example, the text block 130.1 has the value "TOM GREEN HANDYMAN". The value "TOM GREEN HANDYMAN" may thus be referred to as the text block value of the text block 130.1. The position, size and/or area occupied by the text blocks 130.1 through 130.11 may define a document structure of the document 117 of FIG. 1B. The position, size, and/or area may be provided with an error margin that allows for small misalignments due to scanning imprecisions. That is, if the difference between two positions is within the error margin, they may be considered corresponding to each other, e.g., pure coordinates of underlying text blocks of two documents might be different, however after some alignment or normalization, these may be comparable.

Data records stored in the central repository 103 may have values of a set of attributes 109A-P such as a name attribute. Although the present example is described in terms of few attributes, more or less attributes may be used.

Data records stored in the central repository 103 may be received from the client systems 105 and processed by the data integration system 101 before being stored in the central repository 103. The received records may or may not have the same set of attributes 109A-P. For example, a data record received from client system 105 by the data integration system 101 may not have all values of the set of attributes 109A-P, e.g., the data record may have values of a subset of attributes of the set of attributes 109A-P and may not have values for the remaining attributes. In other terms, the records provided by the client systems 105 may have different completeness. The completeness is the ratio of number of attributes of a data record comprising data values to a total number of attributes in the set of attributes 109A-P. In addition, the received records from the client systems 105 may have a structure different from the structure of the stored records of the central repository 103. For example, a client system 105 may be configured to provide records in Extensible Markup Language (XML) format, JavaScript Object Notation (JSON) format or other formats that enable to associate attributes and corresponding attribute values.

In another example, data integration system 101 may import data records of the central repository 103 from a client system 105 using one or more extract, transform, load (ETL) batch processes or via Hypertext Transport Protocol ("HTTP") communication or via other types of data exchange.

The data integration system 101 may be configured to receive requests from a user 110 to provide information of the user that is stored in the system 100. For example, the data integration system 101 may process stored data records 107 and stored documents 117 using the algorithm 120 in accordance with the present subject matter.

Figure 2:
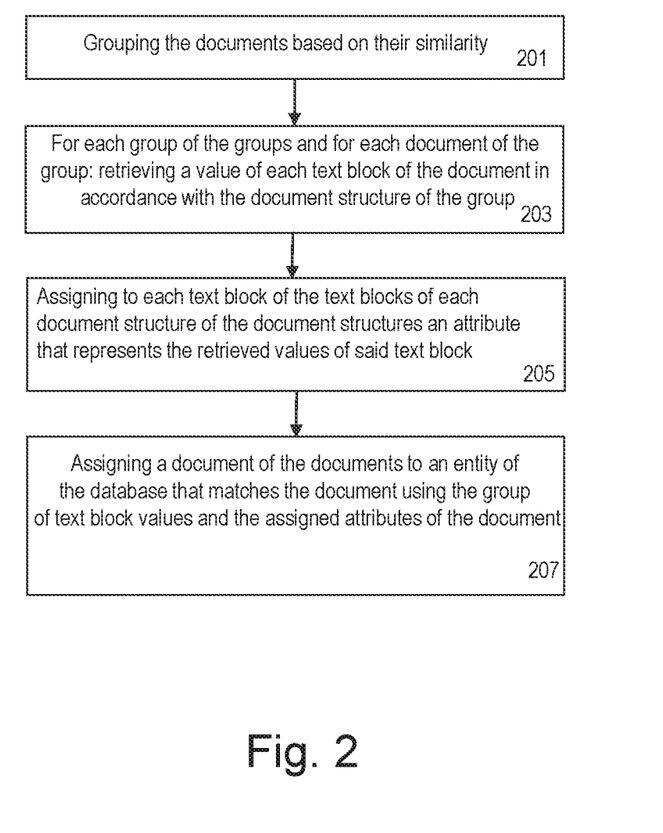
FIG. 2 is a flowchart of an approach for assigning documents to entities of a database in accordance with an embodiment of the present invention.

FIG. 2 is a flowchart of an approach for assigning documents to entities of a database. For the purpose of explanation, the approach described in FIG. 2 may be implemented in the system illustrated in FIG. 1A, but is not limited to this implementation. The approach of FIG. 2 may, for example, be performed by the data integration system 101.

A process of data integration system 101 may group the documents 117 in step 201 based on document similarity. The process of data integration system 101 may perform the grouping such that the documents of each group of the formed groups have a same document structure. The document structure is defined by at least coordinates of text blocks. The grouping may, for example, comprise the process of data integration system 101 analyzing the documents for similarity and sorting the documents into groups so that each group is formed by documents having the same structure (e.g., form and layout). Each group contains the documents with the same structure, meaning that the same pieces of the information are located in the same places in the documents of the group. For example, each document of the documents may be processed using a visual clustering method such as OpenCV in order to detect text blocks in the document. Based on the identified text blocks, the documents may be grouped. Step 201 may, for example, result in N groups $Grp_1, Grp_2 \ldots Grp_N$, where N≥1. Each group $Grp_j$ where j varies between 1 and N, of the groups may comprise a respective number $M_j$ of documents, where $M_j \geq 1$. The documents of each group $Grp_j$ of the groups may have a same document structure. For example, the document structure may be defined by the number, placement and/or size of the text blocks in the document. The document structure of each group $Grp_j$ of the groups may, for example, comprise a respective number $K_j$ of text blocks.

In another example, the grouping may be performed using template matching for finding text blocks of a document that match (e.g. are similar) to a template document. In this case, the documents of each group are associated with the same template.

In step 203, a process of data integration system 101 may perform, for each group of the N groups, so that for each document of the current group $Grp_j$, a value or content of each text block of the document may be retrieved or extracted in step 203 in accordance with the document structure of the current group $Grp_j$. For example, the coordinates of each text block as defined by the document structure may enable extraction of the content of the text block. This may result in each document of the group $Grp_j$ having a group of $K_j$ text block values. This may also result in each text block of the $K_j$ text blocks having $M_j$ text block values. Following the example of FIG. 1B and assuming that the document structure of FIG. 1B is the document structure of the group $Grp_1$ having $M_1=10$ documents and $K_1=11$, each text block of the text blocks 130.1 through 130.11 may have 10 text block values obtained from the 10 documents respectively and each document of the 10 documents has 11 text block values. The values of the text blocks may be extracted using, for example, an OCR tool.

Figure 3:
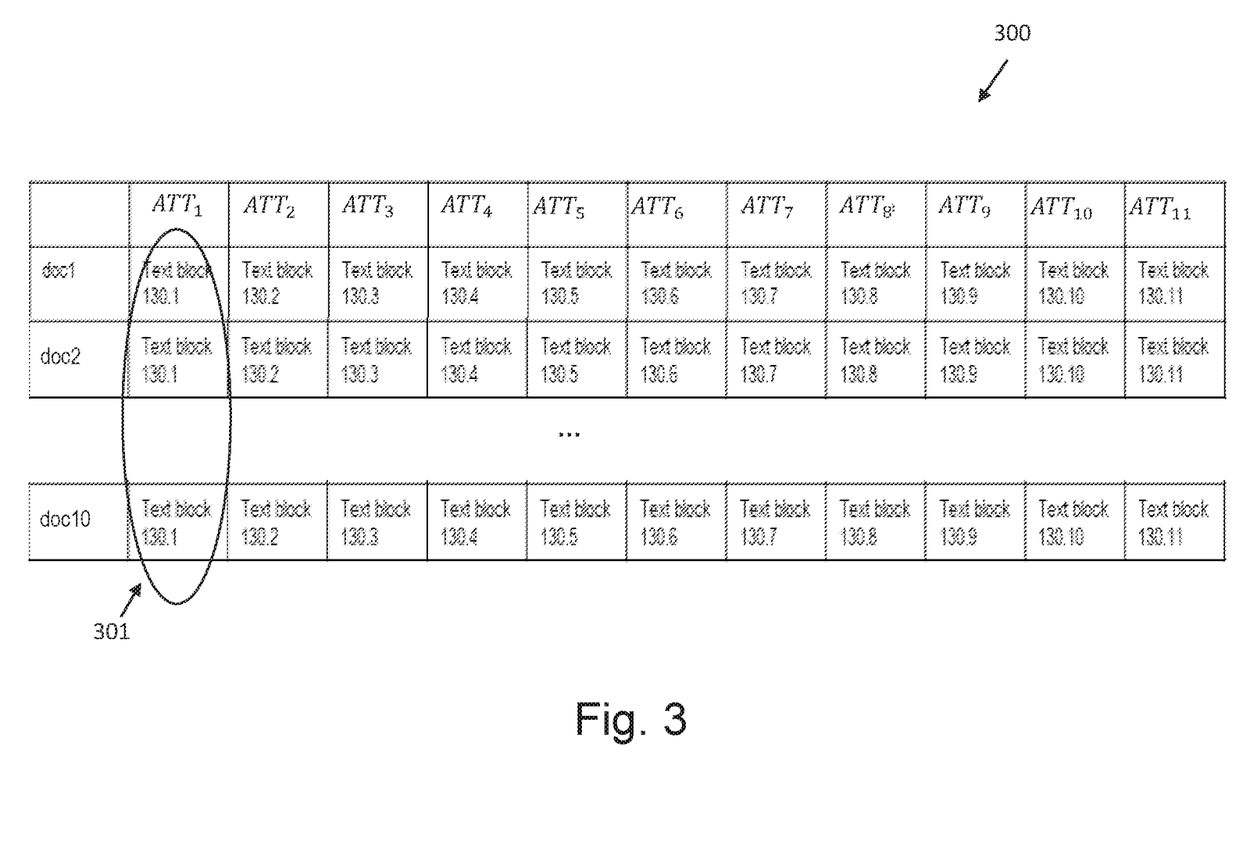
FIG. 3 is a table of attributes assigned to text blocks of a document in accordance with an embodiment of the present invention.

A process of data integration system 101 may assign an attribute, in step 205, to each text block of the $K_j$ text blocks of each document structure of the groups. The attribute represents the retrieved values of said text block. This may result in each document of each group $Grp_j$ having $K_j$ attributes. The attributes may be determined by applying a classifier to the $M_j$ text block values to assign an appropriate label (e.g. address, person name, SSN) to the text block. The classifier may, for example, use a named entity recognition technique to perform the classification. The label indicates the attribute that the text block is likely to represent. Following the above example, the 10 text block values of each text block may be analyzed (e.g. using the classifier) in order to predict based on the format and content of the values the attribute that they represent. This may result in each document of the group $Grp_1$ having 11 attributes. Following the example of FIG. 1B, a process of data integration system 101 may assign the text block 130.1 the attribute "alias," the text block 130.2 may be assigned an attribute "location," etc. FIG. 3 shows one row associated with each document of the group $Grp_1$, wherein each of the 11 text blocks 130.1 to 130.11 is associated with an attribute $ATT_1, ATT_2 \ldots ATT_{11}$ in a table 300. The attribute may be assigned to the text block using, for example, a named entity recognition approach, wherein the named entity recognition approach uses as input the values of the text block and provides as output the attribute. For example, the first column of the table 300 comprises the 10 values 301 of the text block 130.1 which may be analyzed or processed (e.g. by the named entity recognition approach) in order to determine or recognize the attribute $ATT_1$ that represents the text block 130.1.

A process of data integration system 101 may assign a particular document of the documents, in step 207, to an entity of the central repository 103 that matches the particular document using the group of text block values and the assigned attributes of the particular document. For example, the group of text block values and the assigned attributes of the particular document may be fed to an MDM entity recognition component in order to assign data from the document to a particular MDM entity based on the assigned attributes. Following the above example of group $Grp_1$, a document, e.g., doc1 of the group $Grp_1$ may be assigned to an entity of the central repository 103 using the 11 text block values and the 11 assigned attributes of the document doc1 which are in the first row of the table 300. For example, the user 110 may request to assign the particular document to an entity of the database. Upon receiving the request, the method of FIG. 2 may automatically be performed. In another example, the particular document may be a randomly selected document of the documents. In another example, step 207 may be performed for each document of the documents 117 that have been grouped in step 201. The assigning of the particular document to the entity may be performed by matching the $K_j$ text block values of the document with the attribute values of the central repository 103. If the level of matching is higher than a threshold for a given entity this may indicate that the given entity matches the particular document.

In one matching example, a process of data integration system 101 may identify attributes or columns 109A-P of the central repository 103 that correspond to the assigned attributes of the particular document. Assuming, for example, that the particular document is doc1 having the assigned attributes $ATT_1$=alias, $ATT_2$=location ... $ATT_{11}$=doc type, a comparison between the types of attributes $ATT_1$, $ATT_2$ ... $ATT_{11}$ and the set of attributes 109A-P may be performed in order to identify that all or a subset of the attributes 109A-P correspond to at least part of the attributes $ATT_1$, $ATT_2$ ... $ATT_{11}$. For example, the assigned attribute $ATT_1$ alias and the attribute 109A name of the set of attributes 109A-P may correspond to each other as they both refer to a name. The assigned attribute $ATT_2$ location and the attribute 109D address of the set of attributes 109A-P may correspond to each other as they both refer to an address etc. The value of the assigned attribute $ATT_1$ is the value extracted from the text block 130.1 to which the attributes $ATT_1$ is assigned. The number of attributes identified as matching to entity's attributes of the database may, for example, be smaller than or equal to the number of assigned attributes $K_j$=11. The matching may be performed by comparing corresponding pairs of attributes values, e.g., the pairs ($ATT_1$, 109A), ($ATT_2$, 109D), etc. This may result in individual comparison results associated with compared pairs respectively. The individual comparison results may be combined (e.g., averaged) to obtain the level of matching. The comparison may be performed so the values of the identified attributes of each entity of the central repository 103 may be compared with the corresponding text block values.

In another matching example, a process of data integration system 101 may apply a linkage process on existing records of the central repository and the rows representing the documents, e.g., rows of the table 300, with the aim to find candidate pairs that are likely correspond to matches, while discarding a large number of pairwise comparisons that are very unlikely to correspond to a match. The candidate pairs may be associated with the level of matching. The attributes of the candidate pairs may represent the entity of the database that matches the particular document.

In another matching example, an exact matching between the values of the particular document and attribute values of the entity may not be required. That is, the matching may allow for incomplete or partially deviating information. For that, the matching may, for example, use a phonetic representation of names and addresses to allow for typos, standardize names and addresses (e.g., "Bob" is roughly equal to "Robert," "st" is equal to "street," etc.), and/or compute the edit distance between two values. In this way, not only exact matches for the provided values are found, but also partial matches. Each match (which is an entity in the MDM database) is assigned a matching score or confidence score representing the likelihood that the found MDM entity is actually the one that is described by the input values (coming from the scanned document). This may be advantageous, as it helps to increase the effectiveness of the overall approach, since it allows to compensate for imprecisions which may be introduced in previous steps, be it by OCR errors due to bad scanning quality, or data getting assigned into the wrong attribute since some extra line somewhere on the form makes the text block recognition piece assign values into the wrong attribute, and even allow the MDM entity itself to have issues.

Figure 4A:
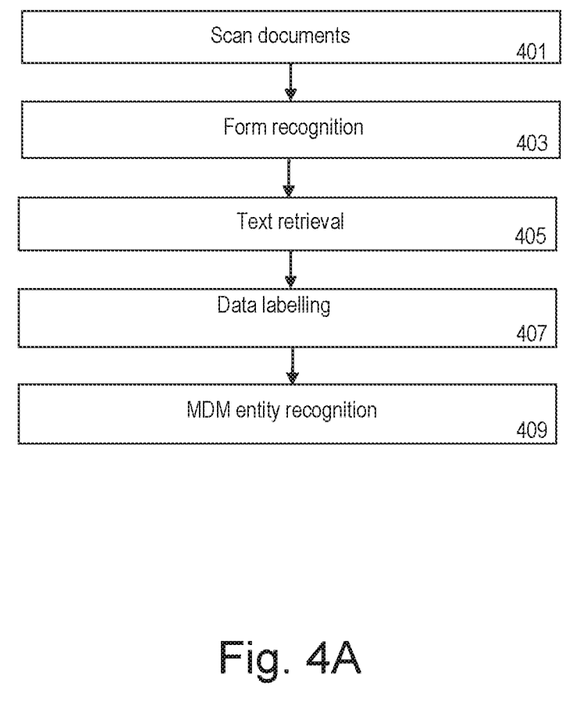
FIG. 4A is a flowchart of an approach for assigning documents to entities of a database in accordance with an embodiment of the present invention.

FIG. 4A is a flowchart of an approach for assigning documents to entities of a database. The flow of the approach of FIG. 4A is illustrated with the diagram of FIG. 4B. The approach of FIG. 4A may be, for example, performed by the data integration system 101.

Figure 4B:
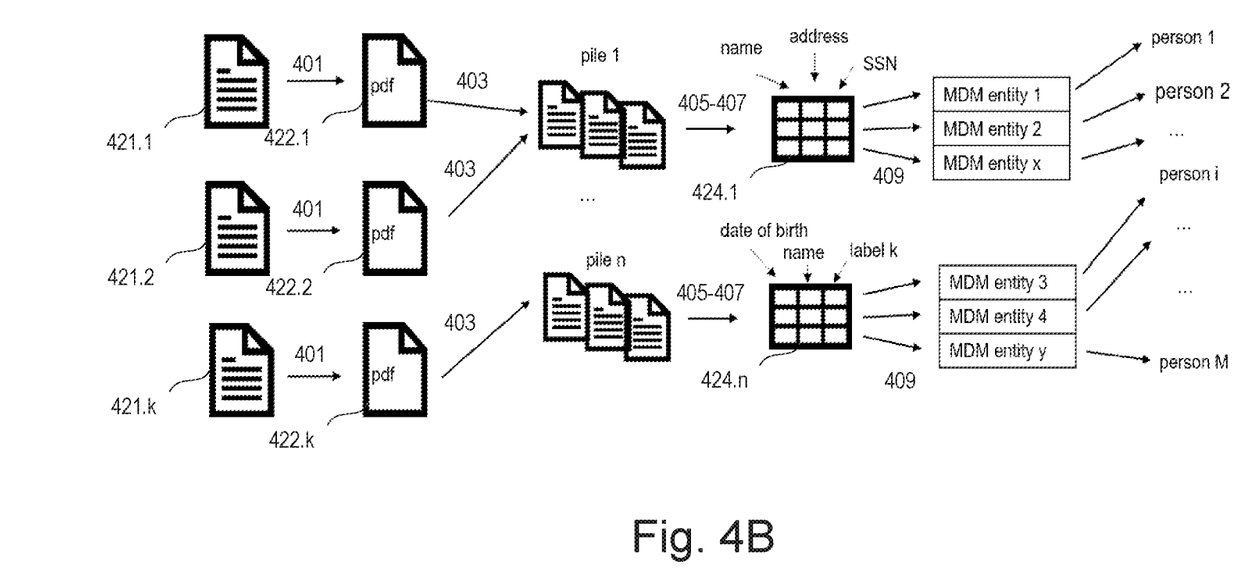
FIG. 4B is a diagram illustrating the flow of the approach of FIG. 4A in accordance with an embodiment of the present invention.

A process of data integration system 101 may scan documents 421.1 through 421.$k$ in step 401. For example, a process of data integration system 101 may scan paper documents and create pdf files 422.1 through 422.$k$.

A process of data integration system 101 may perform a form recognition in step 403. For example, a process of data integration system 101 may group the pdf files 422.1 through 422.$k$ (in step 403) by the underlying form (manually or through the automated system that could visually recognize similar forms, e.g., by visual clustering). As a result, each pile or group of scanned documents has the same base form. This may result in n piles. A process of data integration system 101 may perform the subsequent steps 405 to 409 for each pile separately.

A process of data integration system 101 may perform a text retrieval in step 405. For example, process of data integration system 101 may process each document in the pile via a text recognition tool that extracts text into a raw data table 424.1-424.$n$ associated with the pile. Each column of the table 424.1-424.$n$ refers to a certain input field in the form, and each row represents one document of the pile. Considering that all documents in the pile have the same underlying structure, all columns contain semantically consistent data, representing the same entity attribute.

A process of data integration system 101 may perform a data labelling in step 407. For example, the label or attribute is assigned to each column of the data table 424.1-424.$n$. Labels indicate the attribute of the MDM entity that the column is likely to represent (person name, or address, etc.). Existing data discovery or data classification algorithms may be applied for this purpose.

A process of data integration system 101 may perform an MDM entity recognition in step 409. For example, a process of data integration system 101 may create MDM entities based on the values from the classified columns. A process of data integration system 101 may feed the entities into the standard MDM entity recognition procedure. As a result, for each row of the table 424.1-424.$n$, the list of the potential MDM entities is returned with the corresponding match probabilities. If the probability for a row is higher than a configured threshold, the row may be linked with MDM entity automatically, meaning that the corresponding document may be attached to the entity master data. Otherwise, the data stewards may need to select the match entity to which the document belongs.

Figure 5:
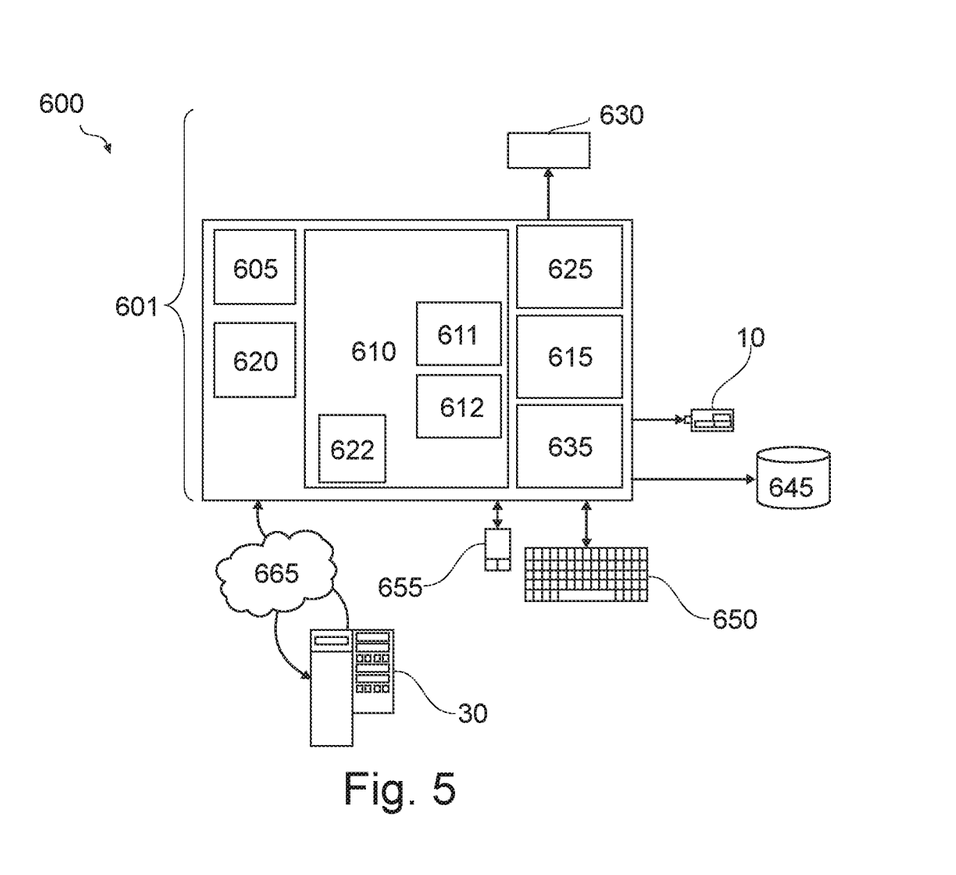
FIG. 5 represents a computerized system, suited for implementing one or more approach steps as involved in an embodiment of the present invention.

FIG. 5 represents a general computerized system 600 suited for implementing at least part of approach steps as involved in embodiments of the present invention.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 5, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention. In the example of FIG. 5, software 612 in the memory 610 includes instructions, e.g., instructions to manage databases such as a database management system.

The software in memory 610 shall also typically include a suitable operating system (OS) 611. The OS 611 essentially controls the execution of other computer programs, such as possibly software 612 for implementing methods as described herein.

The methods described herein may be in the form of a source program 612, executable program 612 (object code), script, or any other entity comprising a set of instructions to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as Wi-Fi, WiMAX, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WWAN) a personal area network (PAN), a virtual private network (VPN), intranet or other suitable network system and includes equipment for receiving and transmitting signals.

If the computer 601 is a personal computer (PC), workstation, intelligent device or the like, the software in the memory 610 may further include a Basic Input/Output System (BIOS). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 5, the methods can be stored on any computer readable medium, such as storage 620, for use by or in connection with any computer related system or method. The storage 620 may comprise a disk storage such as HDD storage.

The present subject matter comprises the following clauses.

Clause 1: A computer-implemented method for assigning documents to entities of a database, the method comprising: grouping the documents based on their similarity, wherein documents of each group have a same document structure, wherein the document structure is defined by at least coordinates of text blocks; for each group of the groups: for each document of the group: retrieving a value of each text block of the document in accordance with the document structure of the group, resulting in each document having a group of text block values; assigning to each text block of the text blocks of the document structure of the group of documents an attribute that represents the retrieved values of said text block; assigning a document of the documents to an entity of the database that matches the document using the group of text block values and the assigned attributes of the document.

Clause 2: The method of clause 1, the database comprising values of a set of attributes, the method further comprising: determining for each attribute of the set of attributes an identification logic based on a format and/or content of the attribute value, the identification logic enabling to recognize values of the respective attribute, wherein the assigning of the attribute to the text block comprises running the logics on the retrieved values of the text block.

Clause 3: The method of clause 1, the database comprising tables and/or columns that correspond to business terms of a business glossary, wherein each term of the business terms is associated with an identification logic based on a format and/or content of the business term, the identification logic enabling to recognize values of the respective term, wherein the assigning of the attribute to the text block comprises running the logics on the retrieved values of the text block.

Clause 4: The method of any of the preceding clauses 1-3, wherein determining that the entity matches the document comprises: comparing the group of text block values with attribute values of the entity based on the assigned attributes, the comparison resulting in a matching probability; determining that the matching probability is higher than a predefined threshold.

Clause 5: The method of any of the preceding clauses 1-3, wherein determining that the entity matches the document comprises: prompting a user with the group of text block values and the assigned attributes in order to select the entity that matches the document, and receiving a selection of the entity.

Clause 6: The method of any of the preceding clauses 1-5, the grouping of the documents based on their similarity is performed using a visual clustering method.

Clause 7: The method of any of the preceding clauses 1-6, further comprising providing predefined templates, wherein the documents of each group are associated with the same template.

Clause 8: The method of any of the preceding clauses 1-7, the documents being forms, wherein the text blocks of the documents are input fields.

Clause 9: The method of any of the preceding clauses 1-8, further comprising providing, to a person associated with the entity, information indicating that the document is associated with the entity.

Clause 10: The method of any of the preceding clauses 1-3 and 5-9, being automatically performed.

Clause 11: The method of any of the preceding clauses 1-10, the database being a master data management (MDM) database.

Clause 12: The method of any of the preceding clauses 1-11, the documents being images, preferably scanned documents.

Clause 13: The method of any of the preceding clauses 1-12, further comprising for each group of the groups: creating a table having columns associated with the text blocks of the document structure of the group respectively and rows associated with the documents of the group respectively; wherein assigning the document to the entity of the database comprises assigning a row of the table associated with the document to the entity of the database.

Clause 14: The method of any of the preceding clauses 1-13, further comprising assigning each document of the documents to the respective entity of the database.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
grouping, by one or more processors, documents into a plurality of groups based on similarity, wherein:
documents of each group have a same document structure; and
the document structure is defined by coordinates of text blocks;
for each group of the plurality of groups and for each document of the respective group:
retrieving, by one or more processors, a value of each text block of the respective document in accordance with a document structure of the group; and
assigning, by one or more processors, to each text block of the respective document an attribute, the attribute comprising a label indicating a type of data that the respective text block is determined to represent;
determining, by one or more processors, that a first document of the documents is associated with an entity of a database, the entity corresponding to a user, based on at least one: (i) text block value of the first document and (ii) assigned attribute of the first document; and
assigning, by one or more processors, the first document to the entity in the database.

2. The method of claim 1, wherein the database comprises values of a set of attributes, further comprising:
determining, by one or more processors, for each attribute of the set of attributes, identification logic based on a format and content of the attribute value, the identification logic acting to recognize values of the respective attribute, wherein assigning the attribute to each text block further comprises running the identification logic on the retrieved values of the text block.

3. The method of claim 1, wherein:
the database comprises tables and columns corresponding to business terms of a business glossary;
each business term of the business terms is associated with identification logic based on a format and content of the business term, the identification logic acting to recognize values of the respective term; and
the assigning of the attribute to the text block comprises running, by one or more processors, the logics on the retrieved values of the text block.

4. The method of claim 1, wherein determining that the first document is associated with the entity comprises:
identifying, by one or more processors, attributes of the database that correspond to at least part of the assigned attributes of the first document;
comparing, by one or more processors, the text block values of the at least part of the assigned attributes with corresponding attribute values of the identified attributes of each entity of the database, the comparison resulting in matching scores; and
comparing, by one or more processors, the highest matching score with a threshold, wherein the entity assigned to the first document is associated with the highest matching score that is higher than the threshold.

5. The method of claim 4, wherein comparing the text block values with the corresponding attribute values is performed using an edit distance between the text block values and corresponding attributes values of the entity and by comparing phonetic representations of the compared values.

6. The method of claim 1, wherein determining that the first document is associated with the entity comprises:
comparing the group of text block values with attribute values of the entity based on the assigned attributes, the comparison resulting in a matching score; and
determining that the matching score is higher than a predefined threshold.

7. The method of claim 1, further comprising:
generating, by one or more processors, a prompt with the group of text block values and the assigned attributes to select the entity that matches the document; and
receiving, by one or more processors, a selection of the entity.

8. The method of claim 1, wherein the grouping of the documents based on similarity is performed using a visual clustering approach.

9. The method of claim 1, further comprising:
providing, by one or more processors, predefined templates, wherein the documents of each group are associated with the same predefined template.

10. The method of claim 1, wherein:
the documents are forms; and
the text blocks of the documents are input fields.

11. The method of claim 1, further comprising:
providing, by one or more processors, to the user associated with the entity, information indicating that the document is associated with the entity.

12. The method of claim 1, wherein the database is a master data management (MDM) database.

13. The method of claim 1, wherein the documents are images.

14. The method of claim 1, further comprising:
for each group of the plurality of groups, creating, by one or more processors, a table having columns associated with the text blocks of the document structure of the group, respectively, and rows associated with the documents of the group, respectively; and
wherein assigning the first document to the entity of the database comprises assigning, by one or more processors, a row of the table associated with the first document to the entity of the database.

15. The method of claim 1, further comprising:
assigning, by one or more processors, each document of the plurality of documents to a respective entity of the database.

16. A computer program product comprising:
one or more computer readable storage media, and program instructions collectively stored on the one or more computer readable storage media, the program instructions comprising:
program instructions to group documents into a plurality of groups based on similarity, wherein:
documents of each group have a same document structure; and
the document structure is defined by coordinates of text blocks;
program instructions to, for each group of the plurality of groups and for each document of the respective group:
retrieving a value of each text block of the respective document in accordance with a document structure of the group; and
assigning to each text block of the respective document an attribute, the attribute comprising a label indicating a type of data that the respective text block is determined to represent;
program instructions to determine that a first document of the documents is associated with an entity of a database, the entity corresponding to a user, based on at least one: (i) text block value of the first document and (ii) assigned attribute of the first document; and
program instructions to assign the first document to the entity in the database.

17. The computer program product of claim 1, wherein the database comprises values of a set of attributes, further comprising:
program instructions, collectively stored on the one or more computer readable storage media, to determine, for each attribute of the set of attributes, identification logic based on a format and content of the attribute value, the identification logic acting to recognize values of the respective attribute, wherein assigning the attribute to each text block further comprises running the identification logic on the retrieved values of the text block.

18. The computer program product of claim 1, wherein:
the database comprises tables and columns corresponding to business terms of a business glossary;
each business term of the business terms is associated with identification logic based on a format and content of the business term, the identification logic acting to recognize values of the respective term; and
the assigning of the attribute to the text block comprises running, by one or more processors, the logics on the retrieved values of the text block.

19. The computer program product of claim 1, wherein program instructions to determine that the first document is associated with the entity comprise:
program instructions to identifying attributes of the database that correspond to at least part of the assigned attributes of the first document;
program instructions to compare the text block values of the at least part of the assigned attributes with corresponding attribute values of the identified attributes of each entity of the database, the comparison resulting in matching scores; and
program instructions to compare the highest matching score with a threshold, wherein the entity assigned to the first document is associated with the highest matching score that is higher than the threshold.

20. A computer system comprising:
one or more computer processors, one or more computer readable storage media, and program instructions collectively stored on the one or more computer readable storage media for execution by at least one of the one or more computer processors, the program instructions comprising:
program instructions to group documents into a plurality of groups based on similarity, wherein:
documents of each group have a same document structure; and
the document structure is defined by coordinates of text blocks;
program instructions to, for each group of the plurality of groups and for each document of the respective group:
retrieving a value of each text block of the respective document in accordance with a document structure of the group; and
assigning to each text block of the respective document an attribute, the attribute comprising a label indicating a type of data that the respective text block is determined to represent;
program instructions to determine that a first document of the documents is associated with an entity of a database, the entity corresponding to a user, based on at least one: (i) text block value of the first document and (ii) assigned attribute of the first document; and program instructions to assign the first document to the entity in the database.

\* \* \* \* \*